(12) United States Patent
Sanow et al.

(10) Patent No.: US 11,308,220 B2
(45) Date of Patent: Apr. 19, 2022

(54) MANAGING SECURITY RELATED INFORMATION TECHNOLOGY SERVICES

(71) Applicant: The Boeing Company, Chicago, IL (US)

(72) Inventors: Taras Michael Sanow, Tukwila, WA (US); Shawn W. Lorimer, Seattle, WA (US); Mohammad Mojtahedzadeh, Seattle, WA (US); Paul Kevin Woods, Seattle, WA (US); Kim Truong La, Bellevue, WA (US); Alissa Lee Burch, Tukwila, WA (US); Melissa Irace, Seattle, WA (US); Steven A. Heimlich, Ann Arbor, MI (US)

(73) Assignee: The Boeing Company, Chicago, IL (US)

( * ) Notice: Subject to any disclaimer, the term of this patent is extended or adjusted under 35 U.S.C. 154(b) by 354 days.

(21) Appl. No.: 16/522,424

(22) Filed: Jul. 25, 2019

(65) Prior Publication Data

US 2021/0026968 A1    Jan. 28, 2021

(51) Int. Cl.
  *G06F 21/57*   (2013.01)
(52) U.S. Cl.
  CPC ...... *G06F 21/577* (2013.01); *G06F 2221/034* (2013.01)
(58) Field of Classification Search
  None
  See application file for complete search history.

(56) References Cited

U.S. PATENT DOCUMENTS

| | | | |
|---|---|---|---|
| 2003/0137426 A1* | 7/2003 | Anthony | B64D 45/0059 340/574 |
| 2014/0137257 A1* | 5/2014 | Martinez | H04L 63/1433 726/25 |
| 2015/0295779 A1* | 10/2015 | Ching | H04L 43/022 715/733 |

(Continued)

OTHER PUBLICATIONS

Extended European Search Report, dated Jul. 17, 2020, regarding Application No. EP20172772.4, 11 pages.

(Continued)

*Primary Examiner* — Fatoumata Traore
(74) *Attorney, Agent, or Firm* — Yee & Associates, P.C.

(57) ABSTRACT

A method, apparatus, and system for managing information technology services. A current security assurance level for an information technology service related to security in an organization is determined based on assessment information about security factors for the information technology service and performance information about a group of current security controls for the information technology service. A target security assurance level for the information technology service is determined based on a criticality of the information technology service. A graphical representation of a difference between the current security assurance level and the target security assurance level on a display system is displayed. When the difference is greater than a threshold, a graphical indication of additional security controls is displayed that, if implemented for the information technology service, results in the difference between the current and target security assurance level being within a desired security assurance level for protecting the information technology service.

20 Claims, 13 Drawing Sheets

(56) References Cited

U.S. PATENT DOCUMENTS

2018/0041533 A1     2/2018   Chesla
2018/0146004 A1*    5/2018   Belfiore, Jr. .......... G06F 21/577
2018/0167414 A1*    6/2018   O'Reilly .................. G06N 3/08
2018/0270265 A1     9/2018   Sage
2019/0377867 A1*   12/2019   Murphy ................ H04L 63/145
2020/0162497 A1*    5/2020   Iyer ..................... H04L 63/1433

OTHER PUBLICATIONS

Gilsinn et al., "Security Assurance Levels: A Vector Approach to Describing Security Requirements," National Institute of Standard Technology (NIST), Oct. 20, 2010, 13 pages. https://ws680.nist.gov/publication/get_pdf.cfm?pub_id=906330.

Gelbstein, "Return on Security Investment-15 Things to Consider," ISACA Journal, vol. 1,2015, 5 pages, https://www.isaca.org/Joural/archives/2015/Volume-1/Pages/Return-on-Security-Investment-15-Things-to-Consider.aspx.

Kohen, "How to calculate your return on security investments," CSO, Oct. 2, 2017, 3 pages. https://www.csoonline.com/article/3229887/how-to-calculate-your-return-on-security-investments.html.

* cited by examiner

INTEGRITY-Modification or destruction of information-maintaining accuracy and trustworthiness  602

- 620 — Low: INTEGRITY is not a key concern and negative impacts would be minimal to none.
- 622 — Medium: Loss of INTEGRITY could have limited/minor negative impacts. Primary airport functions may be marginally impacted, but essential operational capabilities can still be adequately performed. As a secondary consequence, some non-critical functions and efficiencies are noticeably reduced.
- 624 — High: Loss of INTEGRITY could have significant negative impacts on essential capabilities of the airport. Primary airport functions may still be able to support essential operational activities, but workarounds or failover processes may be required. As a secondary consequence, some non-critical functions and efficiencies are significantly reduced.
- 626 — Very High: Loss of INTEGRITY could have serious negative impacts to essential capabilities of the airport. The primary consequence being that the airport is now vulnerable to a cyber or physical attack. Secondary consequences would be adverse impacts to life and safety at the airport.
- 628 — Ext. High: Loss of INTEGRITY could have severe to catastrophic negative impacts. Primary function(s) of the airport are degraded to the point where loss of life and safety are primary consequences.

AVAILABILITY-Loss of operations-Maintenance of HW and SW, redundancy, backup, and disaster recovery  604

- 630 — Low: AVAILABILITY is not a key concern and negative impacts would be minimal to none.
- 632 — Medium: Loss of AVAILABILITY could have limited/minor negative impacts. Primary airport functions may be marginally impacted, but essential operational capabilities can still be adequately performed. As a secondary consequence, some non-critical functions and efficiencies are noticeably reduced.
- 634 — High: Loss of AVAILABILITY could have significant negative impacts on essential capabilities of the airport. Primary airport functions may still be able to support essential operational activities, but workarounds or failover processes may be required. As a secondary consequence, some non-critical functions and efficiencies are significantly reduced.
- 636 — Very High: Loss of AVAILABILITY could have serious negative impacts to essential capabilities of the airport. The primary consequence being that the airport is now vulnerable to a cyber or physical attack. Secondary consequences would be adverse impacts to life and safety at the airport.
- 638 — Ext. High: Loss of AVAILABILITY could have severe to catastrophic negative impacts. Primary function(s) of the airport are degraded to the point where loss of life and safety are primary consequences.

CONFIDENTIALITY-Disclosure of information-limiting access    606

- 640 — Low: CONFIDENTIALITY is not a key concern and negative impacts would be minimal to none.
- 642 — Medium: Loss of CONFIDENTIALITY could have limited/minor negative impacts. Primary airport functions may be marginally impacted, but essential operational capabilities can still be adequately performed. As a secondary consequence, some non-critical functions and efficiencies are noticeably reduced.
- 644 — High: Loss of CONFIDENTIALITY could have significant negative impacts on essential capabilities of the airport. Primary airport functions may still be able to support essential operational activities, but workarounds or failover processes may be required. As a secondary consequence, some non-critical functions and efficiencies are significantly reduced.
- 646 — Very High: Loss of CONFIDENTIALITY could have serious negative impacts to essential capabilities of the airport. The primary consequence being that the airport is now vulnerable to a cyber or physical attack. Secondary consequences would be adverse impacts to life and safety at the airport.
- 648 — Ext. High: Loss of CONFIDENTIALITY could have severe to catastrophic negative impacts. Primary function(s) of the airport are degraded to the point where loss of life and safety are primary consequences.

ENVIRONMENT-Compensating and inherited security controls surrounding the system because it is unable to fully safeguard itself. Examples may include:    608
- General Enterprise controls such as; access control systems, logging, firewalls, air gaps, redundant configurations, etc.
- Associated Policies and Procedures including; Disaster Recovery Plans, Failover Plans, Access Control Policy, Backup/Restoral Procedures
- Contractual Controls (Service Level Agreements), Key Performance Metrics, Nonperformance Penalties, etc.

- 650 — Low: ENVIRONMENT is not a primary concern and the system can protect itself most of the time (80% or higher).
- 652 — Medium: ENVIRONMENT is a limited/minor concern and the system can protect itself some of the time (60%, may need minor compensating controls.
- 654 — High: ENVIRONMENT is a substantial concern and the system can only protect itself minimally (40%), may need significant compensating controls.
- 656 — Very High: ENVIRONMENT is a serious concern and the system can only protect itself marginally (20%), may need extensive compensating controls.
- 658 — Ext. High: ENVIRONMENT is a critical concern and the system has no internal protections (less than 20%), may require maximum level of compensating controls.

FROM FIG. 6A

MANAGING SECURITY RELATED INFORMATION TECHNOLOGY SERVICES

BACKGROUND INFORMATION

1. Field

The present disclosure relates generally to an improved computer system and, in particular, to a method, apparatus, system, and computer program product for managing information technology services related to security in an organization in which an information technology service includes physical components.

2. Background

With respect to security related information technology services, cybersecurity standards are published for use in providing a standard to protect the environment of an organization. The environment includes users, networks, devices, software, and other components that may operate to provide a level of protection for an information technology service related to security.

Cyber security assurance levels (SALs) can be calculated using industry-standard methodology to objectively represent the relative security present for protecting information and components in an organization. Currently, factors such as integrity, confidentiality, and availability are used in calculating a security assurance level for the organization. Questions can be posed to individuals in an organization from which the answers can be used to calculate a security assurance level for the organization. A report can be generated that describes the area or areas which need improvement.

Common industry techniques for calculating security assurance levels for an organization, however, are more difficult than desired. Current techniques are difficult to apply to different organizations, and extensive subject matter expertise (SME) is required in making these calculations. For example, the answers to questions about an organization cannot be made without individuals in the organization who have expert knowledge about different hardware and software components used in the environment for an organization.

Therefore, it would be desirable to have a method and apparatus that take into account at least some of the issues discussed above, as well as other possible issues. For example, it would be desirable to have a method and apparatus that overcome the technical problem with determining a security assurance level for an organization.

SUMMARY

An embodiment of the present disclosure provides a method for managing information technology services. Assessment information about a criticality and a group of security factors for an information technology service related to security in an organization is received. A current security assurance level for the information technology service is determined based on the assessment information about the group of security factors for the information technology service and performance information about a group of current security controls for the information technology service. A target security assurance level for the information technology service is determined based on the information about the criticality of the information technology service. A difference between the current security assurance level and the target security assurance level is determined. The difference is compared to a threshold for a desired security assurance level for protecting against an attack on the information technology service. When the difference is greater than the threshold, a graphical indication of a group of additional security controls is displayed that, if implemented for the information technology service, results in the difference between the current security assurance level and the target security assurance level being within the desired security assurance level for protecting against the attack on the information technology service.

Another embodiment of the present disclosure provides a method to manage information technology services. A current security assurance level for an information technology service related to security in an organization is determined based on assessment information about a group of security factors for the information technology service and performance information about a group of current security controls for the information technology service. A target security assurance level for the information technology service is determined based on the assessment information about a criticality of the information technology service. A graphical representation of a difference between the current security assurance level and the target security assurance level on a display system is displayed. When the difference is greater than a threshold, a graphical indication of a group of additional security controls is displayed that, if implemented for the information technology service, results in the difference between the current security assurance level and the target security assurance level being within a desired security assurance level for protecting against an attack on the information technology service.

Yet another embodiment of the present disclosure provides an information technology service management system comprising a computer system and an information technology service manager in the computer system. The information technology service manager receives assessment information about a criticality and a group of security factors for an information technology service related to security in an organization. The information technology service manager determines a current security assurance level for the information technology service based on the assessment information about the group of security factors for the information technology service and performance information about a group of current security controls for the information technology service. The information technology service manager determines a target security assurance level for the information technology service based on the assessment information about the criticality of the information technology service and determines a difference between the current security assurance level and the target security assurance level. The information technology service manager compares the difference to a threshold for a desired security assurance level for protecting against an attack on the information technology service. The information technology service manager displays, when the difference is greater than the threshold, a graphical indication of a group of additional security controls that, if implemented for the information technology service, results in the difference between the current security assurance level and the target security assurance level being within the desired security assurance level for protecting against the attack on the information technology service.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIGS. 6A and 6B are an illustration of questionnaires for collecting assessment information on a criticality of an information technology service in accordance with an illustrative embodiment;

DETAILED DESCRIPTION

Figure 1:
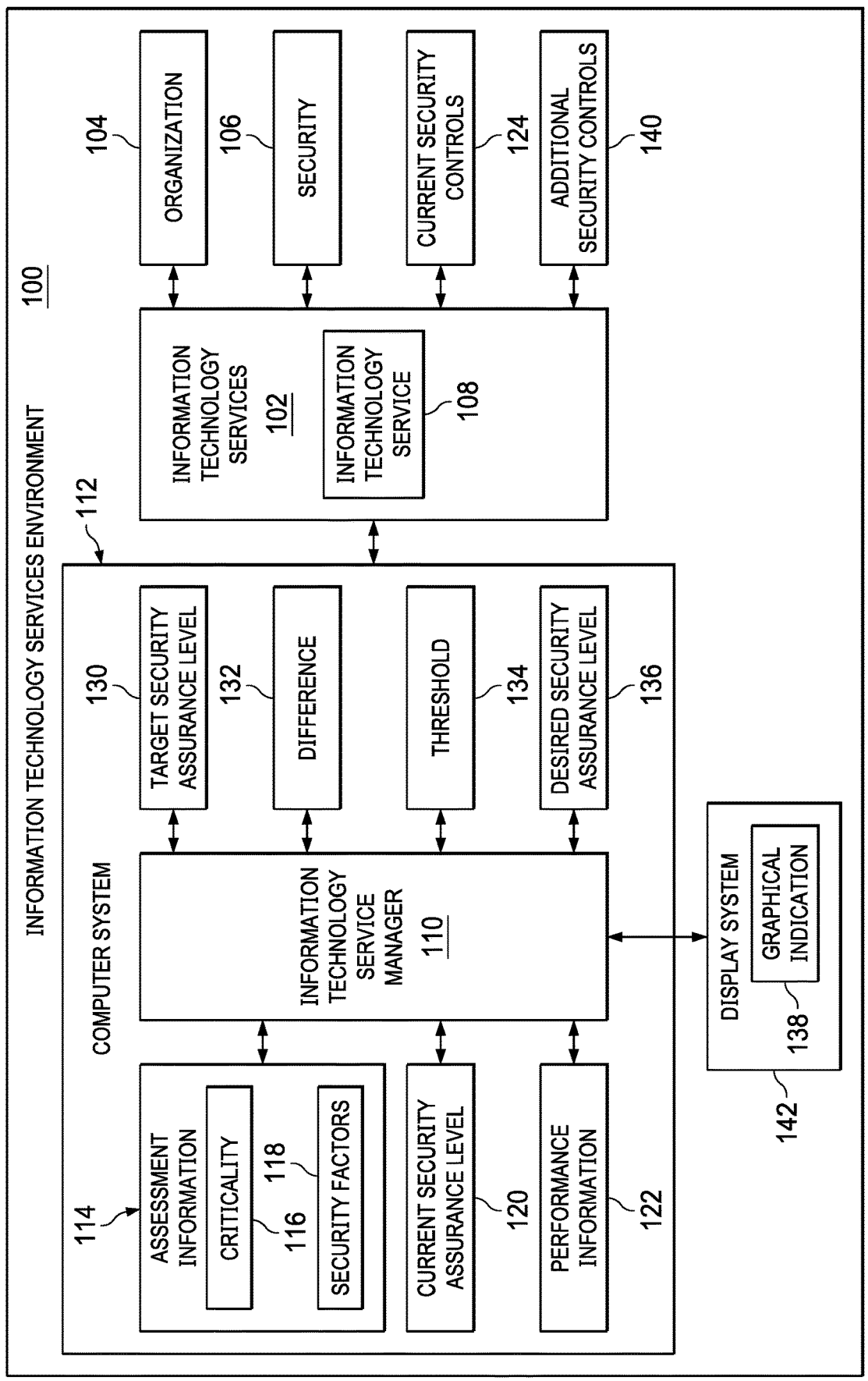
FIG. 1 is an illustration of a block diagram of an information technology services environment in accordance with an illustrative embodiment.

The illustrative embodiments recognize and take into account one or more different considerations. For example, the illustrative embodiments recognize and take into account that current techniques do not prioritize or divide or partition an environment into different information technology services for purposes of determining security assurance levels. The illustrative embodiments recognize and take into account that determining a security assurance level for each information technology service related to security in an environment in an organization can provide an improved view of how well the environment for the organization is protected.

Further, the illustrative embodiments recognize and take into account that providing recommendations for increasing a current security assurance level for an information technology service can be easier to make when the environment is partitioned into different information technology services. The illustrative embodiments recognize and take into account that recommendations for improving security assurance levels can also be easier to make when the importance of each information technology service is identified in determining the security assurance level.

The illustrative embodiments also recognize and take into account that without structuring or identifying different information technology services in an organization, a non-standard security approach can occur. Additionally, the illustrative embodiments also recognize and take into account that inefficient allocation of resources and suboptimal system risk reduction can also occur.

Thus, the illustrative embodiments provide a method, an apparatus, a system, and a computer program product for managing information technology services. In one illustrative example, a computer system determines a current security assurance level for an information technology service related to security in an organization based on assessment information about a group of security factors for the information technology service and performance information about a group of current security controls for the information technology service. The computer system determines a target security assurance level for the information technology service based on the assessment information about the criticality of the information technology service. The computer system displays, when the difference is greater than the threshold, a graphical indication of a group of additional security controls that, if implemented for the information technology service, results in the difference between the current security assurance level and the target security assurance level being within the desired security assurance level for protecting against an attack on the information technology service.

As used herein, a "group of" when used with reference to items, means one or more items. For example, a group of security factors is one or more security factors.

The computer system can also display a graphical representation of a difference between the current security assurance level and the target security assurance level on a display system.

With reference now to the figures and with reference to FIG. 1, an illustration of a block diagram of an information technology services environment is depicted in accordance with an illustrative embodiment. Information technology services environment 100 is an environment in which information technology services 102 for organization 104 can be managed. In this illustrative example, organization 104 is selected from one of an airport authority, an airline, a maintenance service, an aircraft manufacturer, a government agency, a company, a city, and other suitable types of organizations.

As depicted, information technology services 102 is related to security 106 for organization 104. Information technology service 108 in information technology services 102 is a service provided by one or more components. These components can be at least one of a software component or a physical hardware component. These components are in communication with each other through a network. The network can be comprised of at least one of the Internet, an intranet, a local area network (LAN), a metropolitan area network (MAN), a wide area network (WAN), a peer to peer network, an ad hoc network, or some other suitable type of network.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, information technology services 102 can include at least one of a badge reader system, a surveillance system, a security checkpoint system, an x-ray scanner system, a metal detector system, a firewall, an intrusion protection system, or some other suitable information technology service related to security 106 for organization 104. These different services can include at least one of hardware, software, or some combination thereof.

In the illustrative example, information technology service manager 110 in computer system 112 operates to manage information technology services 102 in organization 104. Information technology service manager 110 can be implemented in software, hardware, firmware or a combination thereof. When software is used, the operations performed by information technology service manager 110 can be implemented in program code configured to run on hardware, such as a processor unit. When firmware is used, the operations performed by information technology service manager 110 can be implemented in program code and data and stored in persistent memory to run on a processor unit. When hardware is employed, the hardware can include circuits that operate to perform the operations in information technology service manager 110.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 112 is a physical hardware system and includes one or more data processing systems. When more than one data processing system is present in computer system 112, those data processing systems are in communication with each other using a communications medium. The communications medium can be a network. The data processing systems can be selected from at least one of a computer, a server computer, a tablet computer, or some other suitable data processing system.

As depicted, information technology service manager 110 operates to enable managing security-related information technology services in information technology services 102 in organization 104. In this illustrative example, each information technology service in information technology services 102 can be managed independently of other information technology services in information technology services 102.

In this illustrative example, information technology service manager 110 receives input of assessment information 114 about criticality 116 and a group of security factors 118 for a specific information technology service, such as information technology service 108, related to security 106 for organization 104. Information technology service manager 110 determines current security assurance level 120 for information technology service 108 based on the input of assessment information 114 about the group of security factors 118 for information technology service 108 and performance information 122 about a group of current security controls 124 for the information technology service 108. In this illustrative example, the group of security factors 118 is selected from at least one of a confidentiality, an integrity, an availability, a system environment, or other suitable type of security factor. In this illustrative example, security assurance levels, such as current security assurance level 120, are determined using currently available techniques. For example, security assurance levels can be determined using a standard.

For example, the Security Cyber Security Evaluation Tool (CSET) is a tool from the United States Department of Homeland Security that can be used to determine security assurance levels. As used herein, "CSET" is a registered trademark of the United States Department of Homeland Security.

This software tool takes into account security factors such as integrity, confidentiality, and availability. The currently available tools do not take into account a system environment, which is a factor that is considered in security assessments. Currently available tools can be modified to take into account this additional factor.

As depicted, information technology service manager 110 determines target security assurance level 130 for a specific information technology service, such as information technology service 108, based on input assessment information 114 about criticality 116 of information technology service 108. In this illustrative example, target security assurance level 130 is a desirable level of security for information technology service 108. Other information technology services in information technology services 102 may have different target security assurance levels depending on the criticality of those information technology services in organization 104.

Information technology service manager 110 determines difference 132 between current security assurance level 120 and target security assurance level 130. In this illustrative example, information technology service manager 110 compares difference 132 to threshold 134 for desired security assurance level 136 for protecting against an attack on information technology service 108.

As depicted, threshold 134 can be set in a number of different ways. For example, threshold 134 can be set based on factors such as the financial impact of a cyber security event taking into account direct and indirect costs.

Desired security assurance level 136 can be different amounts of security depending on factors such as criticality, return on security investment (ROSI), difficulty of implementation, and other factors. Desired security assurance level 136 can be different for the same information technology service in different organizations. Desired security assurance level 136 can be as high as what is considered complete security but can be at a lower level depending on the factors considered for information technology service 108.

As depicted, when difference 132 is greater than threshold 134, information technology service manager 110 displays graphical indication 138 of a group of additional security controls 140 that, if implemented for information technology service 108, results in difference 132 between current security assurance level 120 and target security assurance level 130 being within desired security assurance level 136 for protecting against an attack on information technology service 108. This display of graphical indication 138 can be made on display system 142 for computer system 112.

Figure 2:
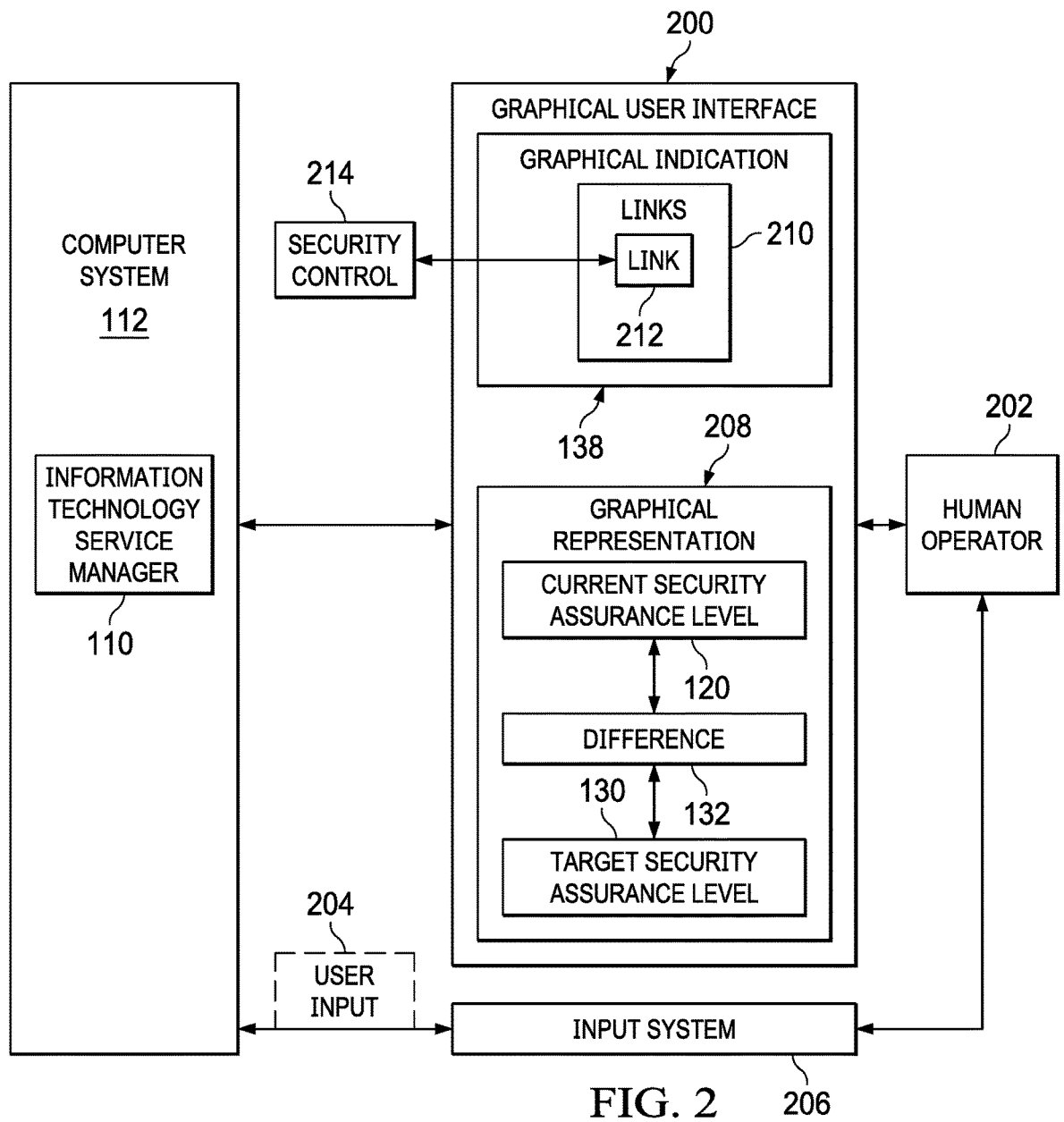
FIG. 2 is an illustration of a block diagram of a graphical user interface in which information is displayed to a human operator in accordance with an illustrative embodiment.

With reference next to FIG. 2, an illustration of a block diagram of a graphical user interface in which information is displayed to a human operator is depicted in accordance with an illustrative embodiment. In the illustrative examples, the same reference numeral may be used in more than one figure. This reuse of a reference numeral in different figures represents the same element in the different figures.

In this illustrative example, graphical user interface 200 is displayed to human operator 202 on display system 142 for computer system 112. Display system 142 is a physical hardware system and includes one or more display devices on which graphical user interface 200 can be displayed with graphical indication 138. The display devices may include at least one of a light emitting diode (LED) display, a liquid crystal display (LCD), an organic light emitting diode (OLED) display, a computer monitor, a projector, a flat panel display, a heads-up display (HUD), or some other suitable device that can output information for the presentation of information.

In this illustrative example, display system 142 is configured to display graphical user interface 200. As depicted, human operator 202 is a person that can interact with graphical user interface 200 through user input 204 generated by input system 206 for computer system 112. Input system 206 is a physical hardware system and can be selected from at least one of a mouse, a keyboard, a trackball, a touchscreen, a stylus, a motion sensing input device, a cyber glove, or some other suitable type of input device.

As depicted, graphical indication 138 of the group of additional security controls 140 can be displayed in graphical user interface 200 on display system 142 for computer system 112 by information technology service manager 110 to human operator 202.

Further, information technology service manager 110 can also display graphical representation 208 of difference 132 between current security assurance level 120 and target security assurance level 130 in graphical user interface 200 on display system 142. In this illustrative example, graphical representation 208 can be selected from at least one of a spider chart, a radar chart, radar graph, an area graph, a histogram, a bar graph, a line graph, a combo chart, or some other suitable graphical representation.

In displaying graphical indication 138 of the group of additional security controls 140 when difference 132 is greater than threshold 134, information technology service manager 110 displays, when difference 132 is greater than threshold 134, graphical indication 138 that comprises a group of links 210 associated with the group of additional security controls 140. In this example, if the group of additional security controls 140 are implemented, difference 132 between current security assurance level 120 and target security assurance level 130 is within desired security assurance level 136 for protecting against an attack on information technology service 108. In other words, graphical indication 138 can be a graphical display of a group of links 210 that can be selected by human operator 202.

As depicted, a selection of link 212 in the group of links 210 initiates implementation of security control 214 corresponding to link 212. In this illustrative example, the implementation can take a number of different forms. For example, selecting link 212 can cause software for security control 214 to be downloaded and installed. In another illustrative example, selecting link 212 can cause the generation of a work order to install software or hardware for security control 214. In yet another illustrative example, a selection of link 212 can cause a request to be made to include security control 214 when upgrades or maintenance are performed for information technology service 108.

Figure 3:
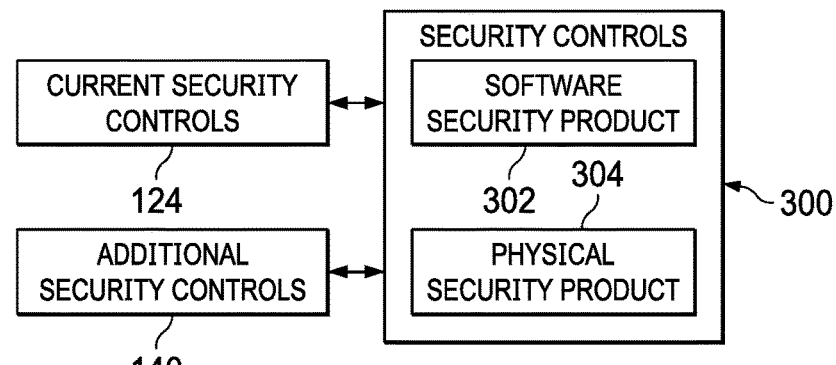
FIG. 3 is an illustration of a block diagram of security controls in accordance with an illustrative embodiment.

Turning next to FIG. 3, an illustration of a block diagram of security controls is depicted in accordance with an illustrative embodiment. As depicted, security controls 300 can be used to implement at least one of current security controls 124 or additional security controls 140.

In this illustrative example, security controls 300 can be selected from at least one of software security product 302 or physical security product 304. The group of current security controls 124 can also be selected from at least one of software security product 302 or physical security product 304. In a similar fashion, the group of additional security controls 140 can be selected from at least one of software security product 302 or physical security product 304. In an illustrative embodiment, information technology service 108 may be a security gate check-point requiring a physical security product 304 such as a security badge, for individuals to pass through the security gate check-point, and the group of additional security controls 140 that can be selected would include a two-factor authentication comprised of both a badge reader for scanning a badge having an embedded code and a keypad device for entry of pin code associated with the badge. In an illustrative embodiment in which the information technology service 108 may be a network server that provides information to other devices within organization through wireless communications, the group of additional security controls 140 that can be selected could include an anti-malware software, an antivirus software, a scanner, a firewall and an access control system. Selection of such additional security controls 140 could implement an antivirus software scanner, for example, where performance information for the additional security control could be monitoring based on the number of false positives of suspect files reported, or the number of malware filed detected and contained.

In this illustrative example, software security product 302 is software that provides security for information technology service 108 in FIG. 1. This security can be protection against cybersecurity attacks, malware, viruses, unauthorized access, or other undesired actions against information technology service 108 in FIG. 1. Software security product 302 can be selected from one of an anti-malware software, an antivirus software, a scanner, a firewall, an access control system, an identity and access management system, a virtual private network server, an intrusion prevention software, and other suitable types of software programs, products, or suites.

In this illustrative example, physical security product 304 is a physical component that can be used to protect access to locations or hardware for information technology service 108 in FIG. 1. In this illustrative example, physical security product 304 can be selected from one of a module, a camera, an iris scanner, an x-ray scanner, a metal detector, and other suitable types of physical components that can be used to protect information technology service 108 in FIG. 1.

Figure 4:
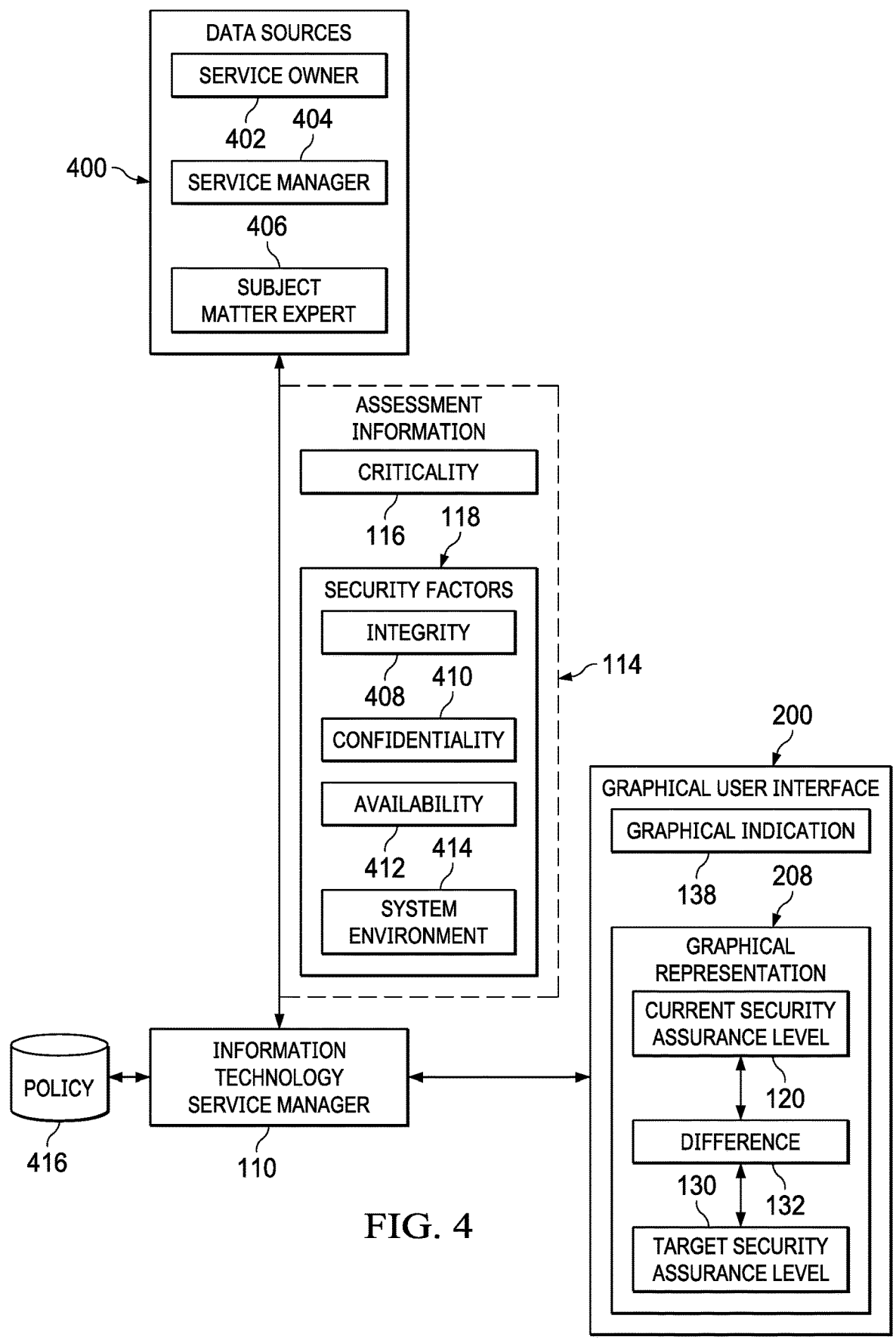
FIG. 4 is an illustration of a dataflow diagram for determining additional security controls for an information technology service in accordance with an illustrative embodiment.

With reference next to FIG. 4, an illustration of a dataflow diagram for determining additional security controls for an information technology service is depicted in accordance with an illustrative embodiment. As depicted, information technology service manager 110 receives assessment information 114 relating to information technology service 108 in organization 104 in FIG. 1.

As depicted, assessment information 114 is received from data sources 400. In this illustrative example, data sources 400 includes at least one of service owner 402, service manager 404, or subject matter expert 406.

Service owner 402 can be a person who provides assessment information 114 about criticality 116 for information technology service 108. For example, service owner 402 can be a person who is accountable for delivering information technology service 108 within an agreed service level.

In this illustrative example, service manager 404 can be a person who provides information about operational importance of information technology service 108. Operational importance can include security factors 118. Service manager 404 is responsible for managing the operation of information technology service 108. For example, service manager 404 can be responsible for negotiating service level agreements and ensuring that the service level agreements are met.

In this illustrative example, security factors 118 can include a number of different factors. For example, security factors 118 can include at least one of integrity 408, confidentiality 410, availability 412, or system environment 414.

As depicted, integrity 408 is the state of information. A loss of integrity 408 can be an unauthorized modification or a destruction of information in information technology service 108. Confidentiality 410 is the confidentiality of information in information technology service 108. A loss of confidentiality 410 occurs when an unauthorized disclosure of information occurs. Availability 412 is the access to information technology service 108. Loss of availability 412 involves a disruption of access or use of information in information technology service 108.

In this illustrative example, system environment 414 represents all security controls to protect information technology service 108 which information technology service 108 cannot adequately provide for itself.

In this illustrative example, subject matter expert 406 can be an expert with respect to information technology service 108. For example, if information technology service 108 comprises security checkpoints in an airport, subject matter expert 406 can be a person that is knowledgeable about security checkpoints. This knowledge can extend to different physical components and software operating at security checkpoints in the airport.

More than one subject matter expert may be present for a particular information technology service. For example, one subject matter expert can be an expert with respect to physical security products while another subject matter expert can be an expert on software security products for security checkpoints.

In this illustrative example, information can be obtained from data sources 400 through a number of different mechanisms. For example, at least one of a questionnaire, an interview, a survey, or other information gathering technique can be used.

The different techniques used to collect assessment information 114 can be selected by information technology service manager 110 using policy 416. In this illustrative example, policy 416 is one or more rules and may include data used to apply the rules. These rules can define at least one of types of information technology services, weightings for security factors 118, types of security controls, or other rules used to collect assessment information 114.

In this illustrative example, information technology service manager 110 can process assessment information 114 to determine current security assurance level 120 and target security assurance level 130 using the rules in policy 416. In this illustrative example, security factors 118 in assessment information 114 and weightings defined in policy 416 for security factors 118 can be used to determine current security assurance level 120. Criticality 116 and policy 416 can be used to determine target security assurance level 130. In the illustrative example, criticality 116 can be based on the impact of security controls. This impact can be the impact of the security controls towards reaching target security assurance level 130.

Further, information technology service manager 110 determines difference 132 between current security assurance level 120 and target security assurance level 130. This difference can also be referred to as a "gap" in this illustrative example.

As depicted, information technology service manager 110 displays graphical user interface 200 with graphical representation 208 of current security assurance level 120 and target security assurance level 130 in which difference 132 is indicated in graphical representation 208. Further, information technology service manager 110 can also display graphical indication 138 with suggestions for a group of additional security controls 140 for information technology service 108.

This information in graphical user interface 200 can be used to determine which of the group of additional security controls 140 should be implemented for information technology service 108. For example, a return on security investment analysis can be made with respect to implementing the group of additional security controls 140 for information technology service 108.

In one illustrative example, one or more technical solutions are present that overcome a technical problem with determining a security assurance level for an organization. As a result, one or more technical solutions can provide a technical effect determining security assurance levels for information technology services related to security in an organization.

The determination of the security assurance level is performed on an information technology service level rather than looking at the environment in which the information technology services operate as a whole. Additionally, one or more technical solutions include an additional security factor in the form of an environment that is used to determine a security assurance level for an information technology service.

Thus, the illustrative example provides a repeatable and customizable technique for determining current security assurance levels and target security assurance levels for different organizations.

Computer system 112 can be configured to perform at least one of the steps, operations, or actions described in the different illustrative examples in FIGS. 1-4 using software, hardware, firmware or a combination thereof. As a result, computer system 112 operates as a special purpose computer system in which information technology service manager 110 in computer system 112 enables managing information technology services environment 100 for an organization in which the information technology services are identified and then evaluated individually in determining security assurance levels. In particular, information technology service manager 110 transforms computer system 112 into a special purpose computer system as compared to currently available general computer systems that do not have information technology service manager 110.

In the illustrative example, the use of information technology service manager 110 in computer system 112 integrates processes into a practical application for managing information technology services that increases the performance of computer system 112. In other words, information technology service manager 110 in computer system 112 is directed to a practical application of processes integrated into information technology service manager 110 in computer system 112 that determines the current and target security assurance levels for an information technology service among multiple information technology services in the environment of an organization. Recommendations are made based on whether the security assurance level for the information technology service related to security is within a threshold from the desired security assurance level. Recommendations can be identified and display to allow for analysis and implementation of additional security controls for protecting the information technology service being evaluated.

In this illustrative example, information technology service manager 110 in computer system 112 can enable downloading and installing a security control in the form of a software security product when a link display with the recommendation for the security controls is selected from a graphical user interface. In this manner, information technology service manager 110 in computer system 112 provides a practical application of managing information technology services in an environment for an organization such that the functioning of computer system 112 is improved as providing a tool for users to visualize evaluations of information technology services and recommendations for additional security controls.

The illustration of information technology services environment 100 in FIG. 1 and the different components in FIGS. 1-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, information technology service manager 110 can be distributed on one or more different data processing systems in computer system 112 or can be located on a single data processing system. As another example, graphical representation 208 can also show the difference between an adjusted security assurance level and at least one of current security assurance level 120 or the target security assurance level 130 in graphical user interface 200 on display system 142.

Figure 5:
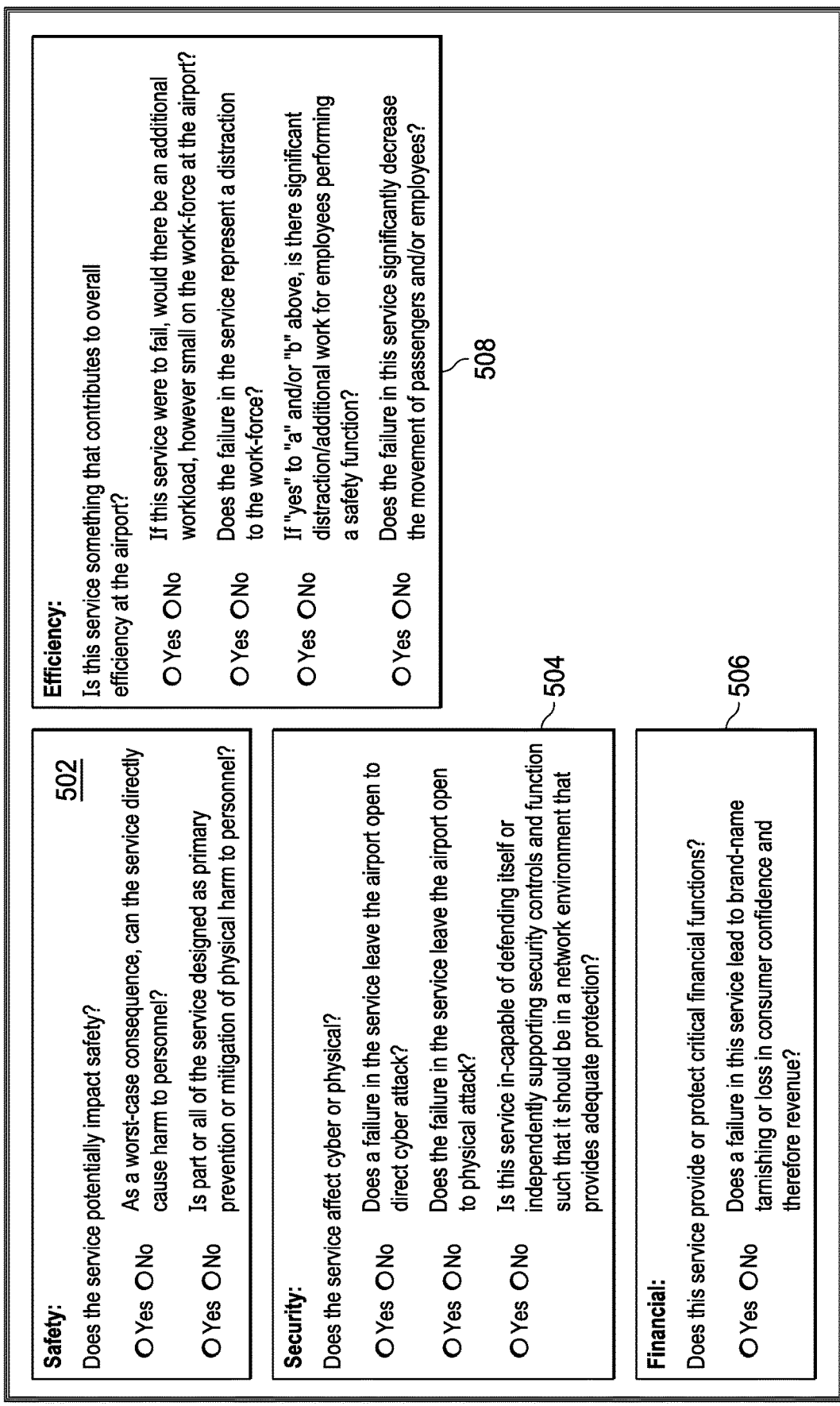
FIG. 5 is an illustration of a questionnaire for collecting assessment information on the criticality of an information technology service in accordance with an illustrative embodiment.

With reference now to FIG. 5, an illustration of a questionnaire for collecting assessment information on the criticality of an information technology service is depicted in accordance with an illustrative embodiment. In this illustrative example, windows 500 are examples of windows for a questionnaire that can be displayed in a graphical user interface to collect assessment information from data sources, such as data sources 400 in FIG. 4.

In this illustrative example, windows 500 includes a number of different windows that can be used to obtain information about criticality 116 for information technology service 108 in FIG. 1. As depicted, windows 500 includes safety window 502, security window 504, financial window 506, and efficiency window 508.

In this illustrative example, safety window 502 includes questions about whether the information technology service would impact safety if the information technology service cannot operate as desired. Security window 504 includes questions about the impact on security if the service cannot operate as desired. Financial window 506 includes questions to determine whether the information technology service would affect financial functions of the organization if the information technology service cannot operate as desired. Efficiency window 508 includes questions to determine whether the efficiency of the organization would be affected if the information technology service cannot operate as desired.

With reference now to FIGS. 6A and 6B, an illustration of questionnaires for collecting assessment information on a criticality of an information technology service is depicted in accordance with an illustrative embodiment. In this illustrative example, windows 600 is an example of windows for a questionnaire that can be displayed in a graphical user interface to collect assessment information from data sources, such as data sources 400 in FIG. 4.

In this illustrative example, windows 600 includes a number of different windows that can be used to obtain assessment information about security factors 118 for information technology service 108 in FIG. 1. As depicted, windows 600 includes integrity window 602, availability window 604, confidentiality window 606, and environment window 608. In this illustrative example, windows 600 is configured to receive responses as to the impact of the information technology service if the information technology service cannot operate as desired. For example, integrity window 602 includes low 620, medium 622, high 624, very high 626, and extremely high 628. These selections are directed towards the impact that would occur if information is modified or destroyed in an unauthorized manner.

Availability window 604 includes low 630, medium 632, high 634, very high 636, and extremely high 638. These selections are directed towards the impact on operations in the organization if the information technology service cannot operate as desired. For example, the impact could be a loss of redundancy, reduced security, or other operations.

In the illustrative example, confidentiality window 606 includes low 640, medium 642, high 644, very high 646, and extremely high 648. These selections are directed towards the impact if information cannot be maintained as confidential.

As depicted, system environment window 608 includes low 650, medium 652, high 654, very high 656, and extremely high 658. These selections are directed towards the impact on the ability of the information technology service to protect itself if the security controls in the environment for the information technology service are unavailable. For example, this question can access the importance of the system environment to the information technology service such as a firewall, an access control system, or other security controls that are for the information technology service.

The illustration of questions in the windows in FIG. 5 and FIGS. 6A and 6B are provided as examples and not meant to limit number or types of questions or the manner in which the questions can be presented. For example, the windows can also include fields for entering additional information. In other illustrative examples, more specific questions or additional windows can be displayed in response to answers to questions to obtain assessment information for determining criticality of the information technology service in the organization. In another example, instead of using low, medium, high, very high, and extremely high, other categories can be used in determining importance. For example, a number system from 1 to 10 can be used to rank the determined importance of security factors for the information technology service.

Figure 7:
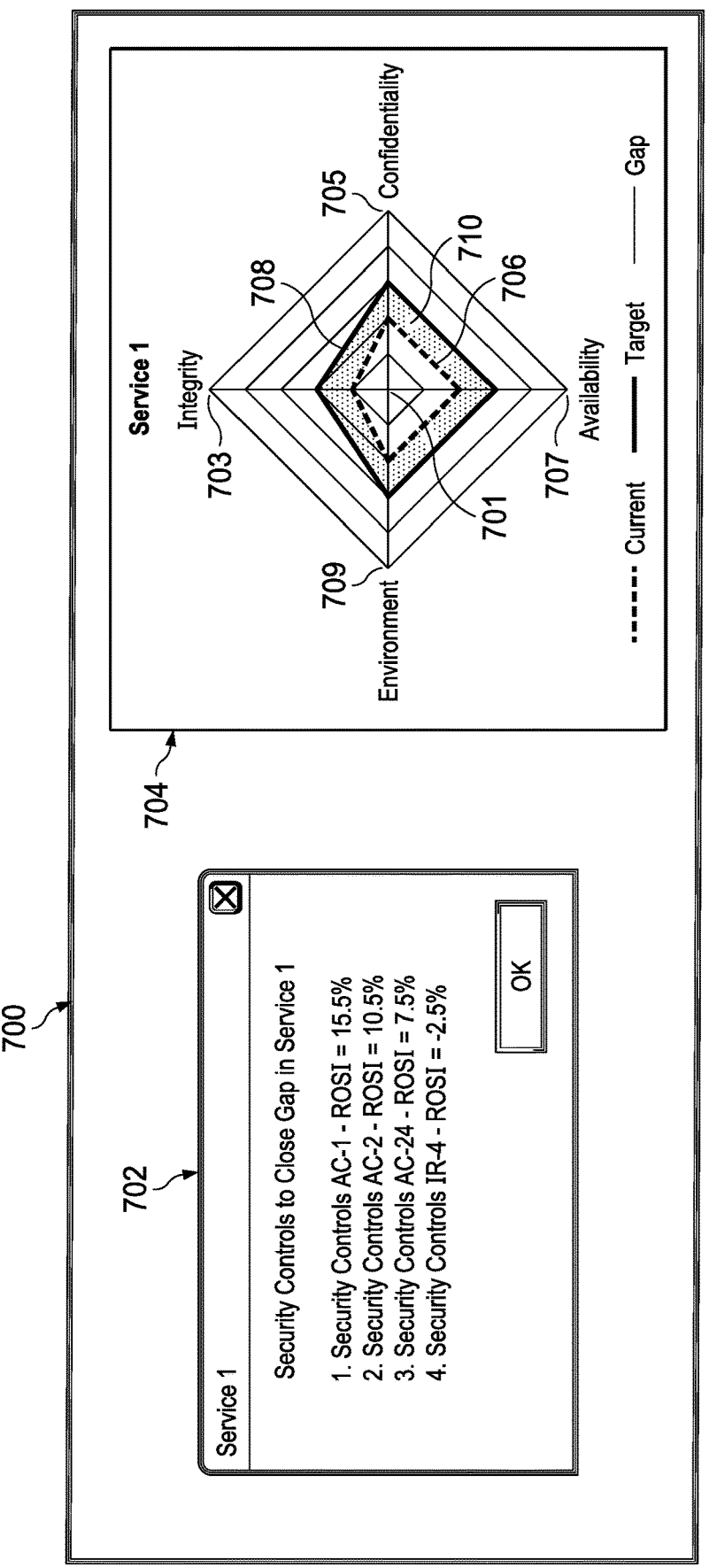
FIG. 7 is an illustration of a graphical user interface for displaying recommendations and security assurance levels in accordance with an illustrative embodiment.
Figure 8:
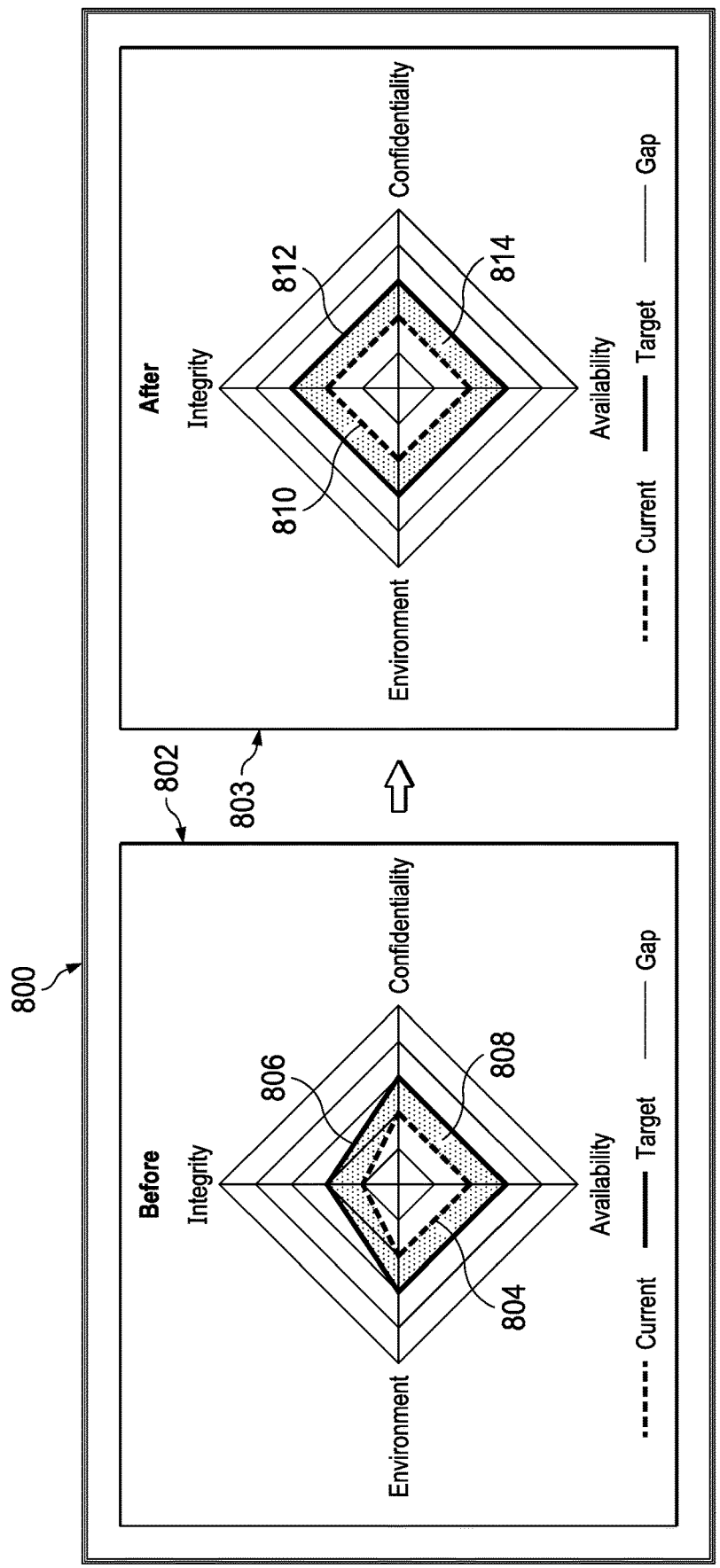
FIG. 8 is an illustration of a graphical user interface for displaying security assurance levels when security controls are not operating as desired in accordance with an illustrative embodiment.
Figure 9:
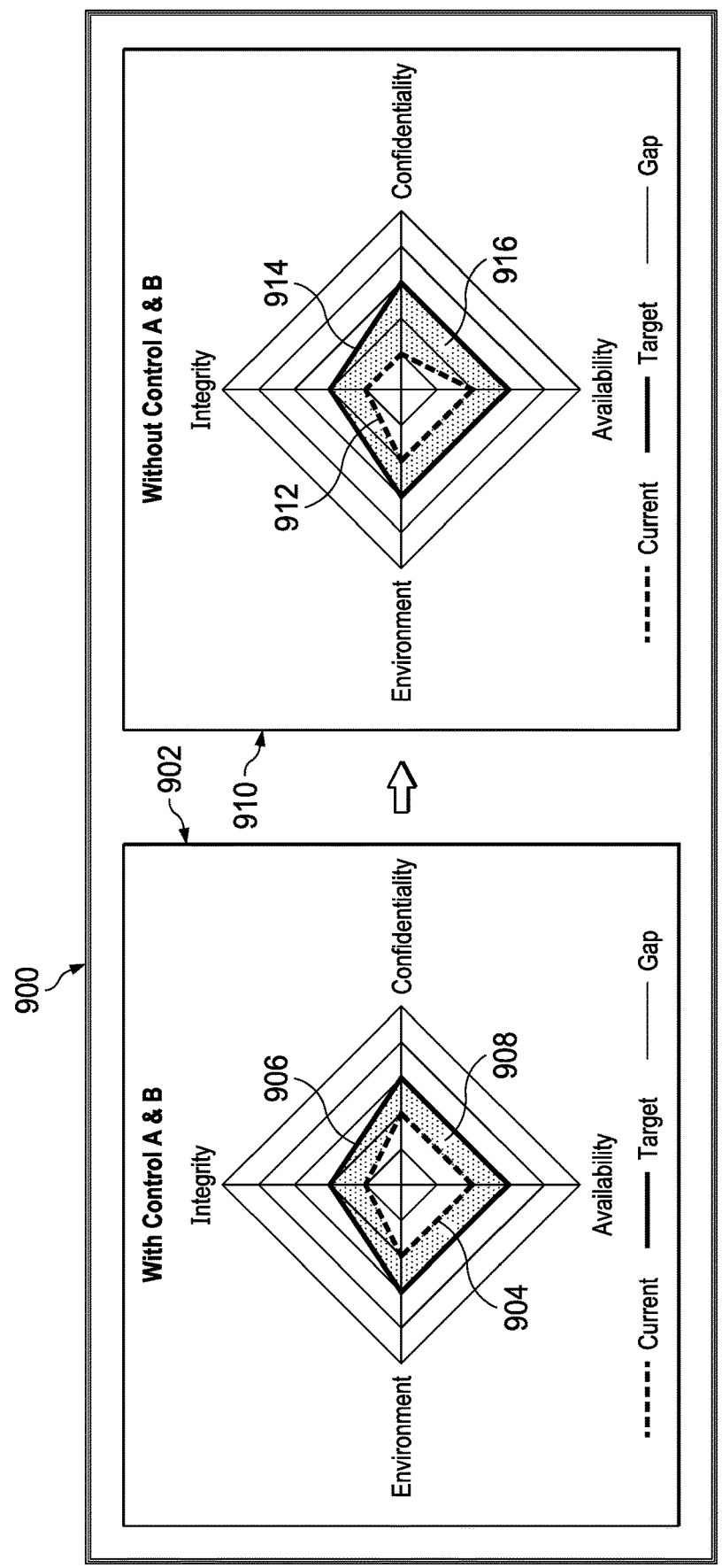
FIG. 9 is an illustration of a graphical user interface for displaying security assurance levels when security controls are not operating as desired in accordance with an illustrative embodiment.

FIGS. 7-9 are examples of graphical user interfaces that can be used to display graphical indications in graphical representations with respect to security assurance levels and recommendations for improvements. With reference to FIG. 7, an illustration of a graphical user interface for displaying recommendations and security assurance levels is depicted in accordance with an illustrative embodiment. In this example, graphical user interface 700 is an example of one implementation for graphical user interface 200 shown in block form in FIG. 2.

As depicted, window 702 in graphical user interface 700 is an example of graphical indication 138 in FIG. 1. Additional security controls are displayed in window 702. Further, in graphical user interface 700, a radar chart or radar graph 704 is an example of graphical representation 208 in FIG. 2. In radar graph 704, axes are present that extend from origin 701. These axes represent security factors. As depicted, axis 703 is integrity; axis 705 is confidentiality; axis 707 is availability; and axis 709 is system environment.

As depicted, radar graph 704 shows current security assurance level 706 and target security assurance level 708. Graphical indicator 710 highlights the difference between current security assurance level 706 and target security assurance level 708.

Turning next to FIG. 8, an illustration of a graphical user interface for displaying recommendations and security assurance levels is depicted in accordance with an illustrative embodiment. In this example, graphical user interface 800 is an example of one implementation for graphical user interface 200 shown in block form in FIG. 2.

In this illustrative example, radar graph 802 shows current security assurance level 804 and target security assurance level 806 before implementing additional security controls. Graphical indicator 808 indicates the difference between security assurance levels.

Radar graph 803 shows current security assurance level 810 and target security assurance level 812 after implementing the additional security controls. Graphical indicator 814 shows the difference between these security assurance levels. In the illustrative example, target security assurance level 812 also changes because the determination of target security assurance level 812 is performed by taking into account the implementation of the additional security controls that have been recommended.

In FIG. 9, an illustration of a graphical user interface for displaying security assurance levels when security controls are not operating as desired is depicted in accordance with an illustrative embodiment. In this example, graphical user interface 900 is an example of one implementation for graphical user interface 200 shown in block form in FIG. 2.

As depicted, radar graph 902 in graphical user interface 900 illustrates current security assurance level 904 and target security assurance level 906 with security control A and security control B. These security controls can be, for example, a firewall and a malware detector. Graphical indicator 908 indicates the difference between the security assurance levels.

In this illustrative example, radar graph 910 in graphical user interface 900 illustrates current security assurance level 912 and target security assurance level 914 without security control A and security control B. Graphical indicator 916 indicates the difference between the security assurance levels.

The illustrations of the graphical user interfaces in FIGS. 7-9 are presented only as examples of how information can be displayed and are not meant to limit the manner in which information can be displayed in other illustrative examples. For example, instead of radar graphs, bar graphs, line graphs, or other types of charts can be used.

Figure 10:
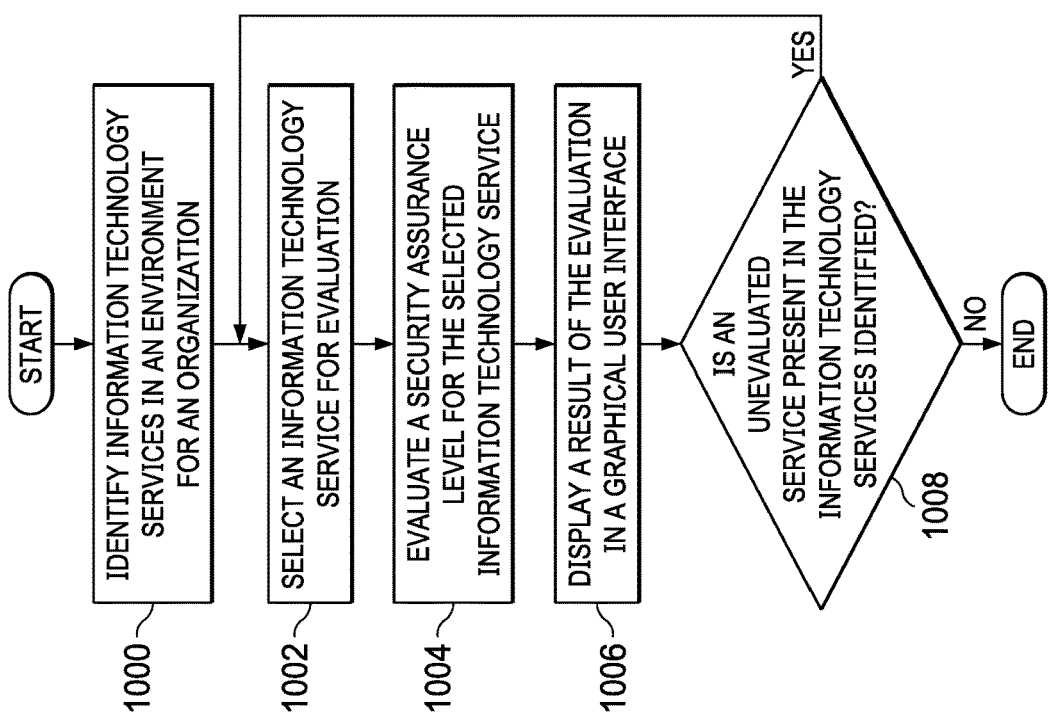
FIG. 10 is an illustration of a flowchart of a process for managing information technology services in accordance with an illustrative embodiment

With reference to FIG. 10, an illustration of a flowchart of a process for managing information technology services is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in information technology service manager 110 in computer system 112 in FIG. 1.

As depicted, the process identifies information technology services in an environment for an organization (operation 1000). The information technology services can be identified through user input from human operators. The user input can be applied to standards or rules in a policy defining information technology services.

The process then selects an information technology service for evaluation (operation 1002). Process evaluates a security assurance level for the selected information technology service (operation 1004). The process displays a result of the evaluation in a graphical user interface (operation 1006).

A determination is made as to whether an unevaluated service is present in the information technology services identified (operation 1008). If an unevaluated information technology service is present, process returns to operation 1002. Otherwise process terminates.

With the results for the different information technology services, changes can be made in the security controls based on recommendations to increase security assurance levels. Some, none, or all of the recommendations can be on a per information technology service basis. The implementation of the recommendations for security controls can be formed using a return on security investment (ROSI) analysis.

Figure 11:
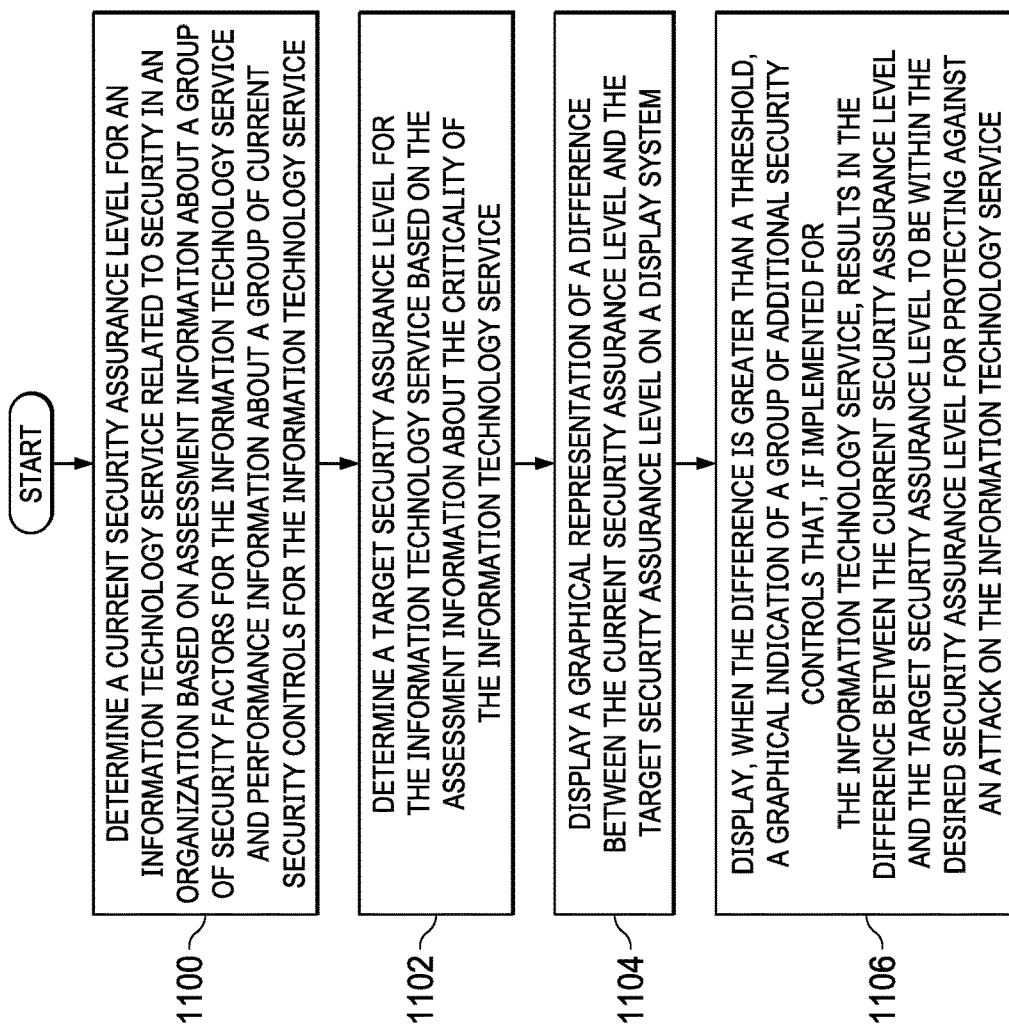
FIG. 11 is an illustration of a flowchart of a process for managing information technology services in accordance with an illustrative embodiment.

Turning next to FIG. 11, an illustration of a flowchart of a process for managing information technology services is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in information technology service manager 110 in computer system 112 in FIG. 1.

The process begins by determining a current security assurance level for an information technology service related to security in an organization based on assessment information about a group of security factors for the information technology service and performance information about a group of current security controls for the information technology service (operation 1100). The process determines a target security assurance level for the information technology service based on the assessment information about the criticality of the information technology service (operation 1102).

The process displays a graphical representation of a difference between the current security assurance level and the target security assurance level on a display system (operation 1104). The process displays, when the difference is greater than a threshold, a graphical indication of a group of additional security controls that, if implemented for the information technology service, results in the difference between the current security assurance level and the target security assurance level being within the desired security assurance level for protecting against an attack on the information technology service (operation 1106). The process terminates thereafter.

Figure 12:
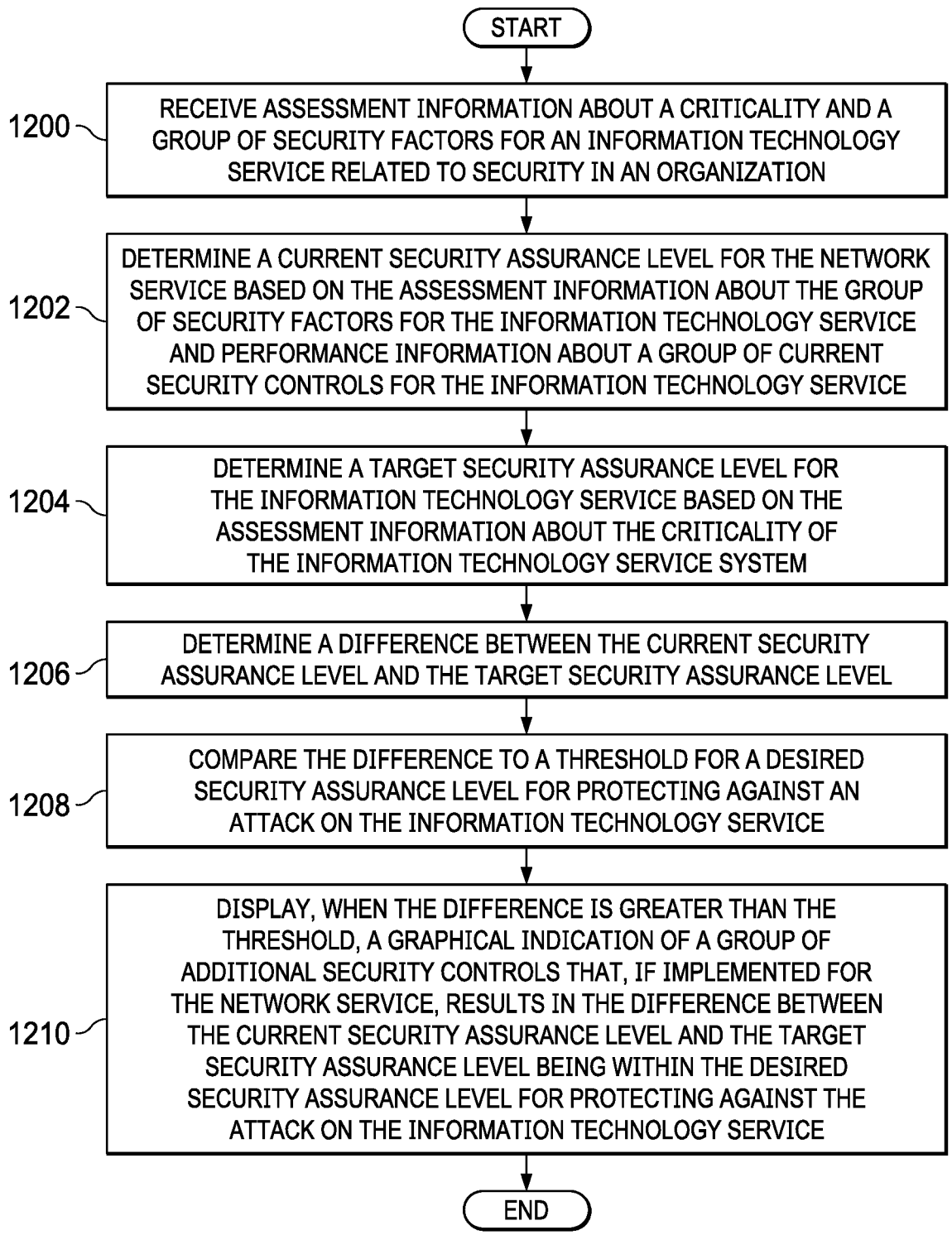
FIG. 12 is another illustration of a flowchart of a process for managing information technology services in accordance with an illustrative embodiment.

With reference next to FIG. 12, another illustration of a flowchart of a process for managing information technology services is depicted in accordance with an illustrative embodiment. The process in FIG. 12 can be implemented in hardware, software, or both. When implemented in software, the process can take the form of program code that is run by one or more processor units located in one or more hardware devices in one or more computer systems. For example, the process can be implemented in information technology service manager 110 in computer system 112 in FIG. 1.

The process begins by receiving assessment information about a criticality and a group of security factors for an information technology service related to security in an organization (operation 1200).

The process determines a current security assurance level for the information technology service based on the assessment information about the group of security factors for the information technology service and performance information about a group of current security controls for the information technology service (operation 1202). The process determines a target security assurance level for the information technology service based on the assessment information about the criticality of the information technology service (operation 1204). The process determines a difference between the current security assurance level and the target security assurance level (operation 1206).

The process compares the difference to a threshold for a desired security assurance level for protecting against an attack on the information technology service (operation 1208). The process displays, when the difference is greater than the threshold, a graphical indication of a group of additional security controls that, if implemented for the information technology service, results in the difference between the current security assurance level and the target security assurance level being within the desired security assurance level for protecting against the attack on the information technology service (operation 1210). The process terminates thereafter.

Figure 13:
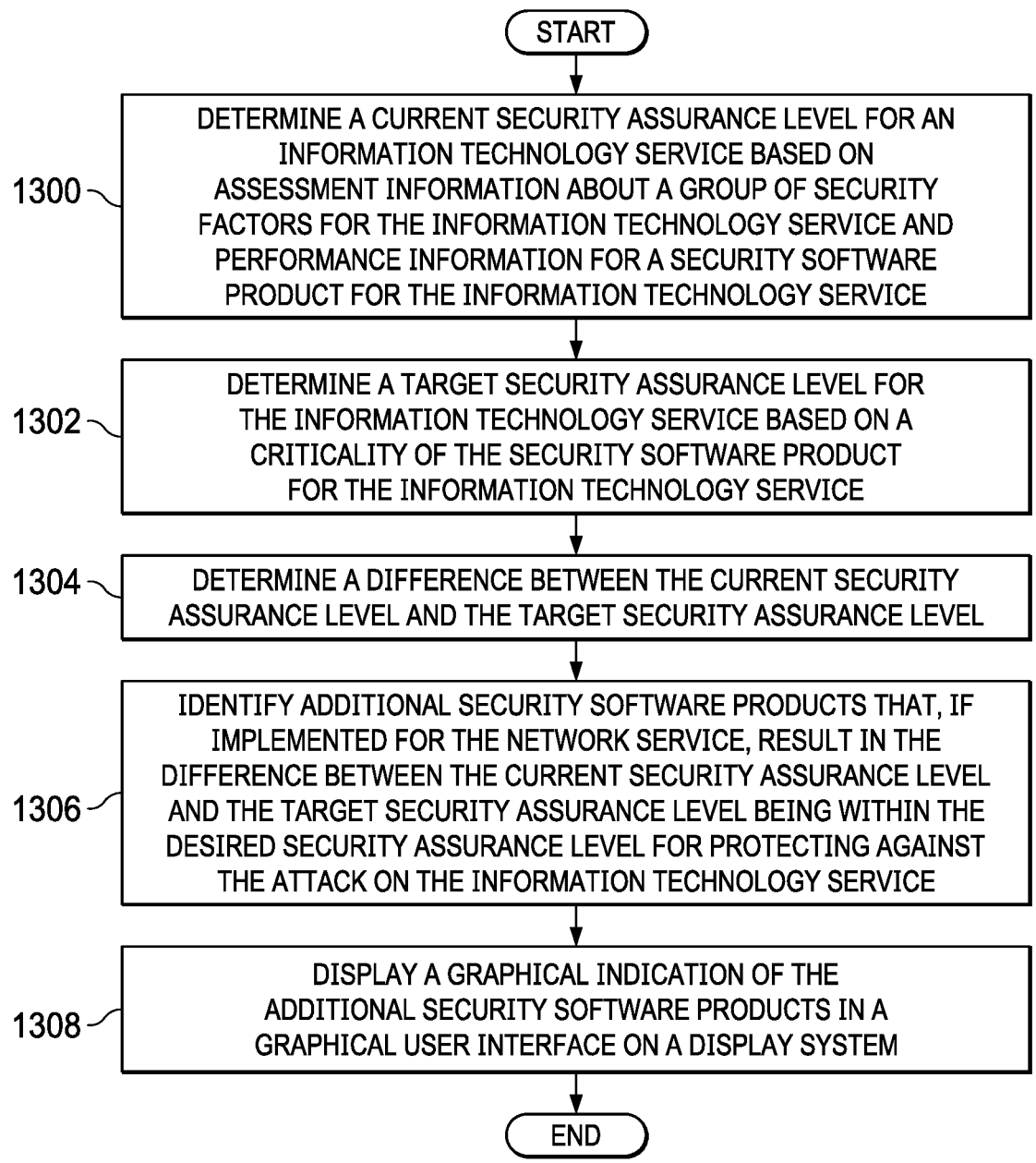
FIG. 13 is an illustration of a flowchart of a process for managing security software products for information technology services in accordance with an illustrative embodiment.

With reference next to FIG. 13, an illustration of a flowchart of a process for managing security software products for information technology services is depicted in accordance with an illustrative embodiment. The process in FIG. 13 can be implemented in hardware, software, or both. When implemented in software, the process can take the form of program code that is run by one or more processor units located in one or more hardware devices in one or more computer systems. For example, the process can be implemented in information technology service manager 110 in computer system 112 in FIG. 1. In this example, the security controls can be security software products.

The process begins by determining a current security assurance level for an information technology service based on assessment information about a group of security factors for the information technology service and performance information for a security software product for the information technology service (operation 1300). For example, an information technology service for security can be a badge reader system. The badge reader system can include or use a security software product such as a virus scan, a firewall, or some other suitable software security product.

In this example, the performance is how the security software product performs when implemented for the badge reader system. The performance information can be, for example, how often the virus scanner generates false-positives in detecting malware or how often the virus scanner misses detecting malware.

The process determines a target security assurance level for the information technology service based on a criticality of the security software product for the information technology service (operation 1302). The process then determines a difference between the current security assurance level and the target security assurance level (operation 1304). When the difference is greater than a threshold, the process identifies additional security software products that, if implemented for the information technology service, result in the difference between the current security assurance level and the target security assurance level being within the desired security assurance level for protecting against the attack on the information technology service (operation 1306).

The process then displays a graphical indication of the additional security software products in a graphical user display on a display system (operation 1308). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 14:
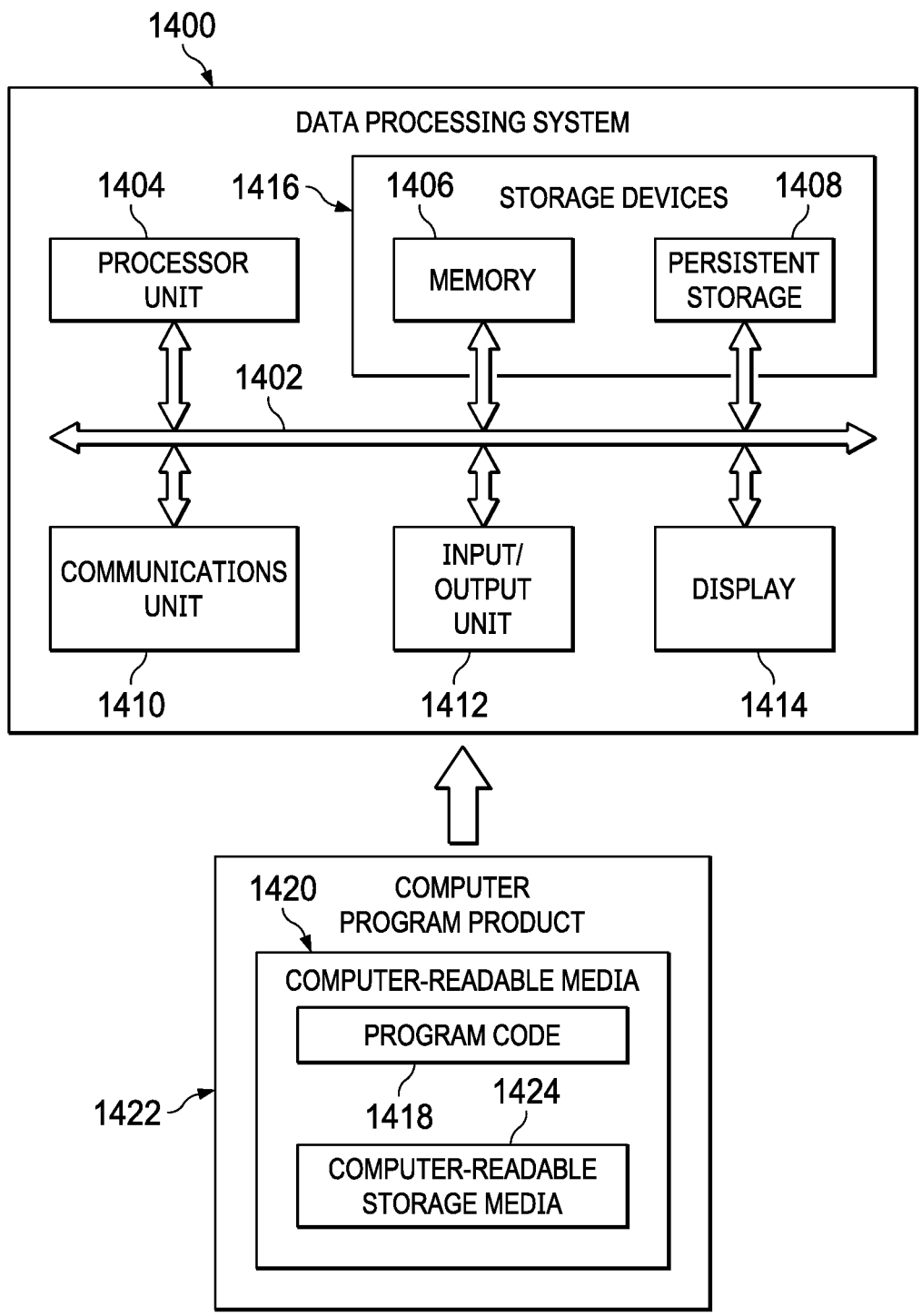
FIG. 14 is an illustration of a block diagram of a data processing system in accordance with an illustrative embodiment.

Turning now to FIG. 14, an illustration of a block diagram of a data processing system is depicted in accordance with an illustrative embodiment. Data processing system 1400 can be used to implement one or more data processing systems in computer system 112 in FIG. 1. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to execute instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 can take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 can provide a connection for user input through at least one of a keyboard, a mouse, or some other suitable input device. Further, input/output unit 1412 can send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which can be located in a memory, such as memory 1406.

These instructions are referred to as program code, computer usable program code, or computer-readable program code that can be read and executed by a processor in processor unit 1404. The program code in the different embodiments can be embodied on different physical or computer-readable storage media, such as memory 1406 or persistent storage 1408.

Program code 1418 is located in a functional form on computer-readable media 1420 that is selectively removable and can be loaded onto or transferred to data processing system 1400 for execution by processor unit 1404. Program code 1418 and computer-readable media 1420 form computer program product 1422 in these illustrative examples. In the illustrative example, computer-readable media 1420 is computer-readable storage media 1424.

In these illustrative examples, computer-readable storage media 1424 is a physical or tangible storage device used to store program code 1418 rather than a medium that propagates or transmits program code 1418.

Alternatively, program code 1418 can be transferred to data processing system 1400 using a computer-readable signal media. The computer-readable signal media can be, for example, a propagated data signal containing program code 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, can be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program code 1418.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Thus, the illustrative examples provide a method, an apparatus, a system, and a computer program product for managing information technology services. In one illustrative example, a current security assurance level for an information technology service related to security in an organization is determined based on assessment information about a group of security factors for the information technology service and performance information about a group of current security controls for the information technology service. A target security assurance level for the information technology service is determined based on the assessment information about a criticality of the information technology service. A graphical representation of a difference between the current security assurance level and the target security assurance level on a display system is displayed. When the difference is greater than a threshold, a graphical indication of a group of additional security controls is displayed that, if implemented for the information technology service, results in the difference between the current security assurance level and the target security assurance level being within a desired security assurance level for protecting against an attack on the information technology service.

In one or more illustrative examples, the use of an information technology service manager can improve the manner in which security controls are implemented in an environment or organization. Illustrative examples include an improved system and method for calculating security assurance levels. In the illustrative examples, an additional factor not currently taken into account with current techniques is the environment. Further, the partitioning of an environment into information technology services also provides a simplified manner for recommending security access controls. Further, the illustrative examples identify differences between current and target security access levels. These differences can be used to determine what changes or recommendations for changes to security controls are made.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing information technology services, the method comprising:
   receiving, by a computer system, assessment information about a criticality and a group of security factors for an information technology service related to security in an organization;
   determining, by the computer system, a current security assurance level for the information technology service based on the assessment information about the group of security factors for the information technology service and performance information about a group of current security controls for the information technology service;
   determining, by the computer system, a target security assurance level for the information technology service based on the assessment information about the criticality of the information technology service;
   determining, by the computer system, a difference between the current security assurance level and the target security assurance level;
   comparing, by the computer system, the difference to a threshold for a desired security assurance level for protecting against an attack on the information technology service;
   determining, by the computer system, a group of additional security controls that when implemented for the information technology service, result in the difference between the current security assurance level and the target security assurance level being within the desired security assurance level for protecting against the attack on the information technology service;
   displaying, by the computer system when the difference is greater than the threshold, a graphical indication of a group of additional security controls with a group of associated links that when implemented for the information technology service, results in the difference between the current security assurance level and the target security assurance level being within the desired security assurance level for protecting against the attack on the information technology service; and
   initiating implementation of a security control corresponding to a link in the group of associated links via selecting the link.

2. The method of claim 1 further comprising:
   displaying, by the computer system, a graphical representation of the difference between the current security assurance level and the target security assurance level on a display system.

3. The method of claim 2, wherein the graphical representation is selected from at least one of a spider chart, a radar chart, a radar graph, an area graph, a histogram, a bar graph, a line graph, or a combo chart.

4. The method of claim 2, wherein displaying, by the computer system when the difference is greater than the threshold, the graphical indication of the group of additional security controls that, if implemented for the information technology service, results in the difference between the current security assurance level and the target security assurance level being within the desired security assurance level for protecting against the attack on the information technology service comprises:
   displaying, by the computer system when the difference is greater than the threshold, the graphical indication of the group of additional security controls that, if implemented for the information technology service, results in the difference between the current security assurance level and the target security assurance level being within the desired security assurance level for protecting against the attack on the information technology service; and
   displaying, by the computer system, a graphical representation of the difference between an adjusted security assurance level and at least one of the current security assurance level or the target security assurance level on a display system.

5. The method of claim 1, wherein determining, by the computer system, the group of additional security controls that, if implemented for the information technology service, results in the difference between the current security assurance level and the target security assurance level being within the desired security assurance level for protecting against the attack on the information technology service comprises:
   determining, by the computer system, the group of additional security controls from a list of security controls that that are prioritized based on a return on security investment, wherein the group of additional security controls if implemented for the information technology service, results in the difference between the current security assurance level and the target security assurance level being within the desired security assurance level for protecting against the attack on the information technology service.

6. The method of claim 1, wherein the group of current security controls comprises a software security product and wherein determining, by the computer system, the current security assurance level for the information technology service based on the assessment information about the group of security factors for the information technology service and the performance information about the group of current security controls for the information technology service comprises:
    determining, by the computer system, the current security assurance level for the information technology service based on the assessment information about the group of security factors for the information technology service and the performance information for the software security product for the information technology service, wherein displaying, by the computer system when the difference is greater than the threshold, the graphical indication of the group of additional security controls that, if implemented for the information technology service, results in the difference between the current security assurance level and the target security assurance level being within the desired security assurance level for protecting against the attack on the information technology service comprises:
    displaying, by the computer system when the difference is greater than the threshold, the graphical indication of a group of additional software security products that, if implemented for the information technology service, results in the difference between the current security assurance level and the target security assurance level being within the desired security assurance level for protecting against the attack on the information technology service.

7. The method of claim 1, wherein the group of security factors is selected from at least one of a confidentiality, an integrity, an availability, or a system environment.

8. The method of claim 1, wherein the group of current security controls is selected from at least one of a software security product or a physical security product.

9. The method of claim 1, wherein the organization is selected from one of an airport authority, an airline, a maintenance service, an aircraft manufacturer, a government agency, a company, and a city.

10. A method for managing information technology services, the method comprising:
    determining, by a computer system, a current security assurance level for an information technology service related to security in an organization based on assessment information about a group of security factors for the information technology service and performance information about a group of current security controls for the information technology service;
    determining, by the computer system, a target security assurance level for the information technology service based on assessment information about a criticality of the information technology service;
    displaying, by the computer system, a graphical representation of a difference between the current security assurance level and the target security assurance level on a display system;
    determining, by the computer system, a group of additional security controls that when implemented for the information technology service, result in the difference between the current security assurance level and the target security assurance level being within a desired security assurance level for protecting against an attack on the information technology service; and
    displaying, by the computer system when the difference is greater than a threshold, a graphical indication of a group of additional security controls with a group of associated links that, when implemented for the information technology service, results in the difference between the current security assurance level and the target security assurance level being within a desired security assurance level for protecting against the attack on the information technology service and
    initiating implementation of a security control corresponding to a link in the group of associated links via selecting the link.

11. The method of claim 10, wherein the assessment information about the criticality of the information technology service comprises a percentage of time that the information technology service can protect itself when security controls of a network surrounding the information technology service are unavailable.

12. An information technology service management system that comprises:
    a computer system that comprises an information technology service manager configured to:
        receive assessment information about a criticality and a group of security factors for an information technology service related to security in an organization, such that the assessment information comprises a percentage of time that the information technology service can protect itself when security controls of a network surrounding the information technology service are unavailable;
        determine a current security assurance level for the information technology service based on the assessment information about the group of security factors for the information technology service and performance information about a group of current security controls for the information technology service;
        determine a target security assurance level for the information technology service based on the assessment information about the criticality of the information technology service;
        determine a difference between the current security assurance level and the target security assurance level;
        compare the difference to a threshold for a desired security assurance level that protects against an attack on the information technology service;
        determine a group of additional security controls that when implemented for the information technology service, result in the difference between the current security assurance level and the target security assurance level being within the desired security assurance level for protecting against the attack on the information technology service; and
        display, when the difference is greater than the threshold, a graphical indication of a group of additional security controls and a group of associated links that, if implemented for the information technology service, results in the difference between the current security assurance level and the target security assurance level being within the desired security assurance level that protects against the attack on the information technology service, wherein a selection of a link in the group of associated links initiates implementation of a security control that corresponds to the link.

13. The information technology service management system of claim 12, wherein the information technology service manager is further configured to display a graphical representation of the difference between the current security assurance level and the target security assurance level on a display system.

14. The information technology service management system of claim 13, wherein the graphical representation is selected from at least one of a spider chart, a radar chart, a radar graph, an area graph, a histogram, a bar graph, a line graph, or a combo chart.

15. The information technology service management system of claim 13, wherein the information technology service manager is further configured to display, when the difference is greater than the threshold, the graphical indication of the group of additional security controls that, if implemented for the information technology service, results in the difference between the current security assurance level and the target security assurance level being within the desired security assurance level for protecting against the attack on the information technology service and displays a graphical representation of the difference between an adjusted security assurance level and at least one of the current security assurance level or the target security assurance level on a display system.

16. The information technology service management system of claim 12, wherein the information technology service manager is further configured to determine the group of additional security controls from a list of security controls that that are prioritized based on a return on security investment, wherein the group of additional security controls if implemented for the information technology service, results in the difference between the current security assurance level and the target security assurance level being within the desired security assurance level for protecting against the attack on the information technology service.

17. The information technology service management system of claim 12, wherein the group of current security controls comprises a software security product, and wherein the information technology service manager is further configured to determine the current security assurance level for the information technology service based on the assessment information about the group of security factors for the information technology service and the performance information for the software security product for the information technology service; and wherein the information technology service manager is further configured to display, when the difference is greater than the threshold, the graphical indication of a group of additional software security products that, if implemented for the information technology service, results in the difference between the current security assurance level and the target security assurance level being within the desired security assurance level for protecting against the attack on the information technology service.

18. The information technology service management system of claim 12, wherein the group of security factors is selected from at least one of a confidentiality, an integrity, an availability, or a system environment.

19. The information technology service management system of claim 12, wherein the group of current security controls is selected from at least one of a software security product or a physical security product.

20. The information technology service management system of claim 12, wherein the organization is selected from one of an airport authority, an airline, a maintenance service, an aircraft manufacturer, a government agency, a company, and a city.

* * * * *